US009923735B2

(12) United States Patent
Akselin et al.

(10) Patent No.: US 9,923,735 B2
(45) Date of Patent: Mar. 20, 2018

(54) SYSTEMS, METHODS, AND APPARATUSES FOR HANDLING A LEGACY CIRCUIT SWITCHED COMMUNICATION

(75) Inventors: Marko Tapani Akselin, Oulu (FI); Jarkko Tuomo Koskela, Oulu (FI); Jussi-Pekka Koskinen, Oulu (FI); Marko Tapani Niemi, Oulu (FI)

(73) Assignee: Nokia Technologies Oy, Espoo (FI)

( * ) Notice: Subject to any disclaimer, the term of this patent is extended or adjusted under 35 U.S.C. 154(b) by 993 days.

(21) Appl. No.: 13/319,315

(22) PCT Filed: Mar. 12, 2010

(86) PCT No.: PCT/FI2010/050190
§ 371 (c)(1),
(2), (4) Date: Jan. 18, 2012

(87) PCT Pub. No.: WO2010/128200
PCT Pub. Date: Nov. 11, 2010

(65) Prior Publication Data
US 2012/0113982 A1    May 10, 2012

Related U.S. Application Data

(60) Provisional application No. 61/175,615, filed on May 5, 2009.

(51) Int. Cl.
*H04L 12/66*     (2006.01)
*H04W 76/06*    (2009.01)
*H04W 76/02*    (2009.01)

(52) U.S. Cl.
CPC ........... *H04L 12/66* (2013.01); *H04W 76/062* (2013.01); *H04W 76/02* (2013.01)

(58) Field of Classification Search
None
See application file for complete search history.

(56) References Cited

U.S. PATENT DOCUMENTS

2009/0036131 A1    2/2009  Diachina et al.
2010/0113010 A1*   5/2010  Tenny et al. ................. 455/423

FOREIGN PATENT DOCUMENTS

CN         1359585 A      7/2002
CN       101222765 A      7/2008
(Continued)

OTHER PUBLICATIONS

3rd Generation Partnership Project; Technical Specification Group Core Network and Terminals; Non-Access-Stratum (NAS) protocol for Evolved Packet System (EPS); Stage 3 (Release 8), 3GPP TS 24.301, v8.1.0, Mar. 2009, pp. 1-250.
(Continued)

*Primary Examiner* — Ayaz Sheikh
*Assistant Examiner* — Sori Aga
(74) *Attorney, Agent, or Firm* — Mintz Levin Cohn Ferris Glovsky and Popeo, P.C.

(57) ABSTRACT

Systems, methods, and apparatuses are provided for handling a legacy circuit switched communication. A method may include receiving a service request message at a network node on a packet switched network that does not support circuit switched fallback. The method may additionally include determining that the service request message includes a request for establishment of a communication requiring a circuit switched connection and having a user equipment connected to the packet switched network as an end point of the communication. The method may further include releasing the connection between the user equipment and the packet switched network in response to the determination. Corresponding systems and apparatuses are also provided.

19 Claims, 6 Drawing Sheets

(56) References Cited

FOREIGN PATENT DOCUMENTS

| EP | 2247039 A1 | 11/2010 | |
|---|---|---|---|
| WO | 2008/023162 A2 | 2/2008 | |
| WO | WO-2008023162 A2 * | 2/2008 | ............... H04Q 7/38 |
| WO | 2009/000315 A1 | 12/2008 | |

OTHER PUBLICATIONS

International Search Report and Written Opinion received for corresponding Patent Cooperation Treaty Application No. PCT/FI2010/050190, dated Jun. 22, 2010, 14 pages.

Salkintzis et al., "Voice Call Handover Mechanisms in Next-Generation 3GPP Systems", IEEE Communications Magazine, vol. 47, Issue 2, Feb. 2009, pp. 46-56.

Apostolis K. Salkintzis, "Voice Call Handover Mechanisms in Next-Generation 3GPP Systems", IEEE Communications Magazine, Institute of Electrical and Electronics Engineers, Feb. 28, 2009.

NTT Docomo et al. "CS Fallback: Overview and Open Issues", 3GPP Draft; R2-080027 CSFB_Overview Ver. 7, 3rd Generation Partnership Project (3GPP), Mobile Competence Centre; 650, Route Des Lucioles; F-06921 Sophia-Antipolis Cedex; France, vol. RAN WG2, No. Seville, Spain; Jan. 18, 2008. Jan. 9, 2008.

* cited by examiner

SYSTEMS, METHODS, AND APPARATUSES FOR HANDLING A LEGACY CIRCUIT SWITCHED COMMUNICATION

RELATED APPLICATION

This application was originally filed as PCT Application No. PCT/FI2010/050190, filed Mar. 12, 2010, which claims priority benefit from U.S. Provisional Patent Application No. 61/175,615, filed May 5, 2009.

TECHNOLOGICAL FIELD

Embodiments of the present invention relate generally to communication technology and, more particularly, relate to systems, methods, and apparatuses for handling a legacy circuit switched communication.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

However, coverage by these new networking technologies, which may comprise packet switched (PS) networks (e.g., an Internet Protocol (IP) Multimedia Subsystem (IMS) capable network), may not be universal as they are deployed. Moreover, as these new PS networks are deployed, they may not initially support all modes of communication. For example, upon initial deployment of a PS network, full IMS support for voice over IP (VoIP) may not be provided by the PS network and accordingly the PS network may not support a voice call. Accordingly, a mobile terminal connected to a PS network may not be able to engage in a voice call unless transferred to a legacy circuit switched (CS) network configured to support voice calls. Some PS networks implement procedures referred to as circuit switched fallback (CSFB), wherein the PS network is configured to handover a mobile terminal to a network capable of supporting CS connections when the mobile terminal is an end point for a communication requiring a CS connection.

However, not all PS networks support CSFB and accordingly, a mobile terminal connected to a PS network that does not support CSFB may not be able to engage in a communication, such as a voice call, that may require a CS connection.

BRIEF SUMMARY OF SOME EXAMPLES OF THE INVENTION

Systems, methods, apparatuses, and computer program products are therefore provided for handling a legacy circuit switched communication. In this regard, systems, methods, apparatuses, and computer program products are provided that may provide several advantages to computing devices and network operators. Embodiments of the invention facilitate the release of a user equipment that is connected to a packet switched network that does not support circuit switched fallback when the user equipment is an endpoint for a communication requiring a circuit switched connection. In this regard, embodiments of the invention enable the released user equipment to reselect to a network or network cell that supports circuit switched connection so that the user equipment may engage in the communication.

In a first exemplary embodiment, a method is provided, which comprises determining, on a user equipment connected to a packet switched network that does not support circuit switched fallback, that the user equipment is an end point for a communication requiring a circuit switched connection. The determination may be performed by a circuit switched communication enabler of the user equipment. The method of this embodiment further comprises initiating a release of the user equipment from the packet switched network.

Initiating a release may comprise sending a request for connection release to a network node on the packet switched network. The network node on the packet switched network may comprise a mobility management entity. The method may additionally comprise receiving a connection release. The connection release may comprise redirection information proposing a circuit switched capable cell. The method may further comprise sending a circuit switched connection establishment request to a network node on a circuit switched capable cell.

The packet switched network may comprise an evolved universal mobile telecommunications system terrestrial radio access network. The user equipment may be connected to the packet switched network in an active connection mode, such as EMM-CONNECTED mode and/or ECM-CONNECTED mode. The communication requiring a circuit switched connection may comprise a voice call. The user equipment may comprise an originating or terminating end point for the communication.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for determining that a user equipment connected to a packet switched network that does not support circuit switched fallback is an end point for a communication requiring a circuit switched connection. The second program instruction of this embodiment is for initiating a release of the user equipment from the packet switched network.

The second program instruction may comprise instructions for initiating a release by causing a request for connection release to be sent to a network node on the packet switched network. The network node on the packet switched network may comprise a mobility management entity. The computer program product may additionally comprise a third program instruction for causing a connection release to be received. The connection release may comprise redirection information proposing a circuit switched capable cell. The computer program product may further comprise a fourth program instruction for causing a circuit switched connection establishment request to be sent to a network node on a circuit switched capable cell.

The packet switched network may comprise an evolved universal mobile telecommunications system terrestrial radio access network. The user equipment may be connected to the packet switched network in an active connection mode, such as EMM-CONNECTED mode and/or ECM-CONNECTED mode. The communication requiring a circuit switched connection may comprise a voice call. The user equipment may comprise an originating or terminating end point for the communication.

In another exemplary embodiment, an apparatus is provided. The apparatus of this embodiment comprises a processor and a memory storing instructions that when executed by the processor cause the apparatus to determine that the apparatus is an end point for a communication requiring a circuit switched connection, wherein the apparatus is connected to a packet switched network that does not support circuit switched fallback. The instructions of this embodiment when executed by the processor further cause the apparatus to initiate a release of the apparatus from the packet switched network.

The instructions when executed by the processor may cause the apparatus to initiate a release by sending a request for connection release to a network node on the packet switched network. The network node on the packet switched network may comprise a mobility management entity. The instructions when executed by the processor may also cause the apparatus to receive a connection release. The connection release may comprise redirection information proposing a circuit switched capable cell. The instructions when executed by the processor may further cause the apparatus to send a circuit switched connection establishment request to a network node on a circuit switched capable cell.

The packet switched network may comprise an evolved universal mobile telecommunications system terrestrial radio access network. The apparatus may be connected to the packet switched network in an active connection mode, such as EMM-CONNECTED mode and/or ECM-CONNECTED mode. The communication requiring a circuit switched connection may comprise a voice call. The apparatus may comprise an originating or terminating end point for the communication.

In another exemplary embodiment, an apparatus is provided, which comprises means for determining that the apparatus is an end point for a communication requiring a circuit switched connection, wherein the apparatus is connected to a packet switched network that does not support circuit switched fallback. The apparatus of this embodiment further comprises means for a release of the apparatus from the packet switched network.

In another exemplary embodiment, a method is provided, which comprises receiving a service request message at a network node on a packet switched network that does not support circuit switched fallback. The method of this embodiment additionally comprises determining that the service request message comprises a request for establishment of a communication requiring a circuit switched connection and having a user equipment connected to the packet switched network as an end point of the communication. The determination may be performed by a service facilitator of the network node. The method of this embodiment further comprises releasing the connection between the user equipment and the packet switched network in response to the determination.

Releasing the connection may comprise sending the user equipment a connection release message. The connection release message may comprise redirection information proposing a circuit switched capable cell for the user equipment to reselect to.

The network node on the packet switched network may comprise a mobility management entity. The packet switched network may comprise an evolved universal mobile telecommunications system terrestrial radio access network. The user equipment may be connected to the packet switched network in an active connection mode, such as EMM-CONNECTED mode and/or ECM-CONNECTED mode. The communication requiring a circuit switched connection may comprise a voice call. The user equipment may comprise an originating or terminating end point for the communication.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for causing a service request message to be received by a network node on a packet switched network that does not support circuit switched fallback. The second program instruction of this embodiment is for determining that the service request message comprises a request for establishment of a communication requiring a circuit switched connection and having a user equipment connected to the packet switched network as an end point of the communication. The third program instruction of this embodiment is for releasing the connection between the user equipment and the packet switched network in response to the determination.

The third program instruction may comprise instructions for releasing the connection by sending the user equipment a connection release message. The connection release message may comprise redirection information proposing a circuit switched capable cell for the user equipment to reselect to.

The network node on the packet switched network may comprise a mobility management entity. The packet switched network may comprise an evolved universal mobile telecommunications system terrestrial radio access network. The user equipment may be connected to the packet switched network in an active connection mode, such as EMM-CONNECTED mode and/or ECM-CONNECTED mode. The communication requiring a circuit switched connection may comprise a voice call. The user equipment may comprise an originating or terminating end point for the communication.

In another exemplary embodiment, an apparatus is provided. The apparatus of this embodiment comprises a processor and a memory storing instructions that when executed by the processor cause the apparatus to receive a service request message, wherein the apparatus comprises a network node on a packet switched network that does not support circuit switched fallback. The instructions of this embodiment when executed by the processor additionally cause the apparatus to determine that the service request message comprises a request for establishment of a communication requiring a circuit switched connection and having a user equipment connected to the packet switched network as an end point of the communication. The instructions of this embodiment further cause the apparatus to release the connection between the user equipment and the packet switched network in response to the determination.

The instructions when executed by the processor may cause the apparatus to release the connection by sending the user equipment a connection release message. The connection release message may comprise redirection information proposing a circuit switched capable cell for the user equipment to reselect to.

The apparatus may comprise a mobility management entity. The packet switched network may comprise an evolved universal mobile telecommunications system terrestrial radio access network. The user equipment may be connected to the packet switched network in an active mode, such as EMM-CONNECTED mode and/or ECM-CONNECTED mode. The communication requiring a circuit switched connection may comprise a voice call. The user equipment may comprise an originating or terminating end point for the communication.

In another exemplary embodiment, an apparatus is provided, which includes means for receiving a service request message, wherein the apparatus comprises a network node on a packet switched network that does not support circuit switched fallback. The apparatus of this embodiment additionally comprises means for determining that the service request message comprises a request for establishment of a communication requiring a circuit switched connection and having a user equipment connected to the packet switched network as an end point of the communication. The apparatus of this embodiment further comprises means for releasing the connection between the user equipment and the packet switched network in response to the determination.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
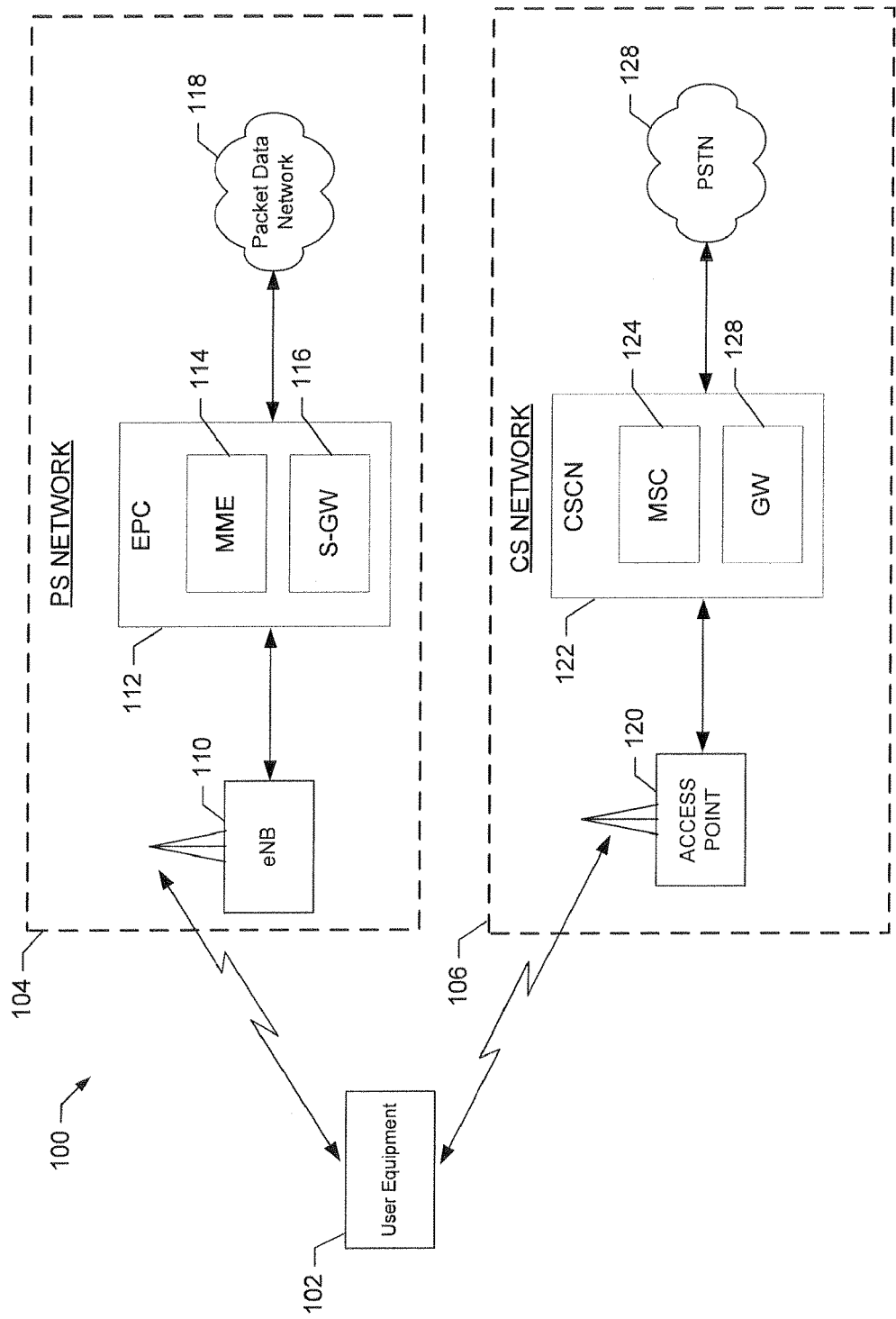
FIG. 1 illustrates a system for handling a legacy circuit switched communication according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system 100 for handling a legacy circuit switched communication according to an exemplary embodiment of the present invention. As used in the scope of this document, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for handling a legacy circuit switched communication, numerous other configurations may also be used to implement embodiments of the present invention. Further, it will be appreciated that where references herein are made to specific types of communications networks (e.g., LTE, E-UTRAN, Global System for Mobile Communications Edge Radio Access Network (GERAN), and/or the like) and specific terminology for system entities, it will be appreciated that embodiments of the invention are applicable to communications networks not using standards of the referenced network(s) and to system entities performing similar functions to those described herein, but which are referred to using different terminology in accordance with other network standards.

In at least some embodiments, the system 100 includes a user equipment (UE) 102, a packet switched (PS) network 104, and a circuit switched (CS) network 106. The PS network 104 may comprise any packet switched public land mobile network. In an exemplary embodiment, the PS network 104 comprises a network operating in accordance with LTE standards. The CS network 106 may comprise any circuit switched public land mobile network, such as, for example, a GERAN network, UMTS Terrestrial Radio Access Network (UTRAN), and/or the like.

The PS network 104 may comprise an evolved node B (eNB) 110 and an evolved packet core (EPC) 112. The eNB 110 may be configured to provide radio access to the UE 102 such that the UE 102 may access the PS network 104. The EPC 112 may comprise, for example, a mobility management entity (MME) 115, serving gateway (S-GW) 116, packet data node (PDN, not shown) gateway (P-GW, not shown), and/or other entities, which may provide a network architecture for managing the PS network 104. The EPC 112 may provide a connection to a network, such as the packet data network 118, which may, for example, comprise or otherwise provide access to the internet.

The CS network 106 may comprise an access point 120 and a circuit switched core network (CSCN) 122. The access point 120 may comprise a base station, node B, or other entity configured to provide radio access to the UE 102 such that the UE 102 may access the CS network 106. In some embodiments, the access point 120 comprises a base station which is connected to the CSCN 122 by means of a radio network controller node (RNC, not shown). The CSCN 122 may comprise a mobile switching center (MSC) 124, gateway 128, and/or other entities, which may provide a network architecture for managing the CS network 106 and may be configured to manage switching to facilitate voice calls and/or data transfer within the CS network 106. The CSCN 122 may provide a connection to a network, such as the public switched telephone network (PSTN) 128, which may, for example, comprise or otherwise provide access to the internet.

The UE 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like that is configured to access the PS network 104 and CS network 106, and/or network 108 through radio signals exchanged with access points 110 and 120. In this regard, the UE 102 may be within radio range of both the eNB 110 and the access point 120. In some embodiments, the UE 102 may be configured to access the PS network 104 in accordance with LTE standards. In an exemplary embodiment, the UE 102 is embodied as a mobile terminal, such as that illustrated in FIG. 2.

The terminal 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like that is configured to access the network 106 via the base station 104. In an exemplary embodiment, the terminal 102 is embodied as a mobile terminal, such as that illustrated in FIG. 2.

Figure 2:
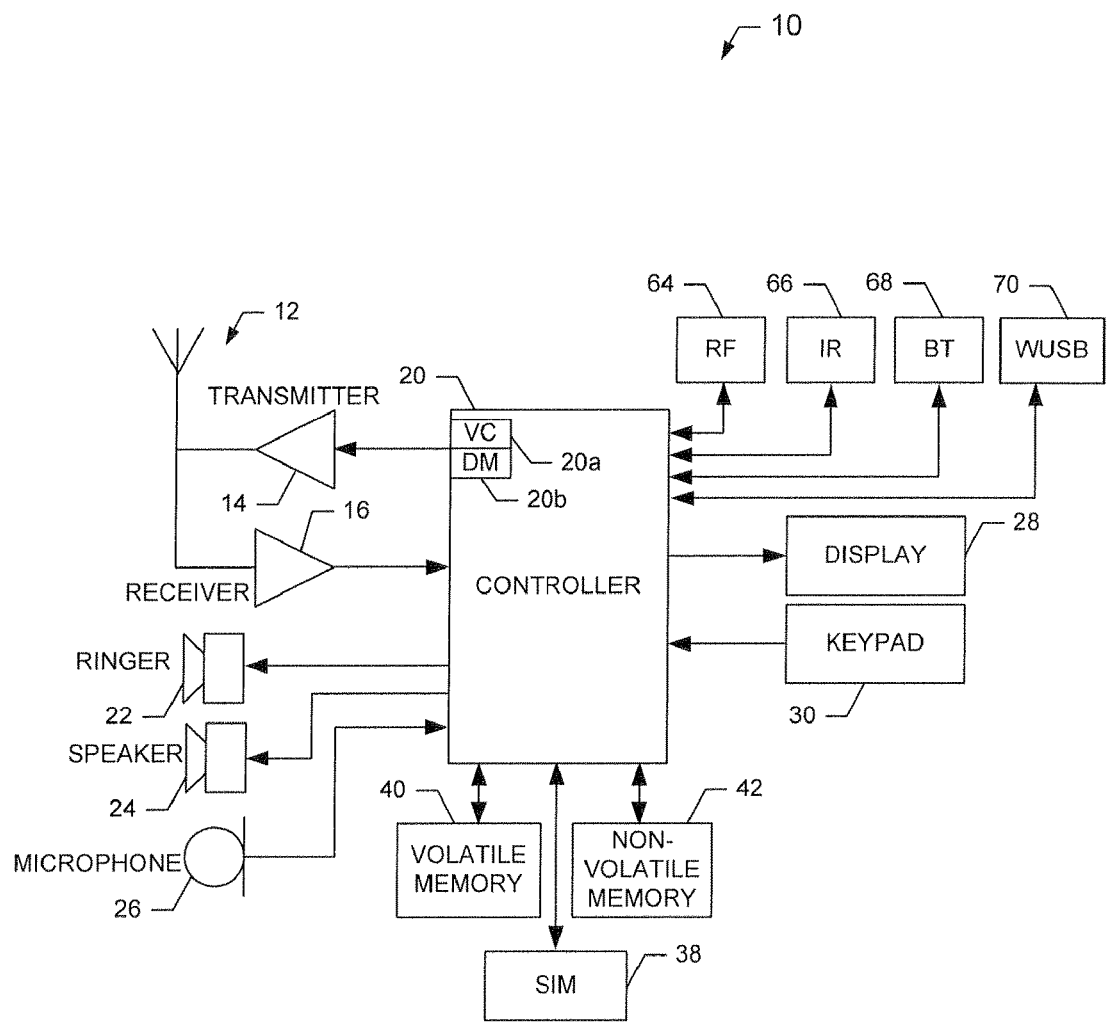
FIG. 2 is a schematic block diagram of a mobile terminal according to an exemplary embodiment of the present invention.

In this regard, FIG. 2 illustrates a block diagram of a mobile terminal 10 representative of one embodiment of a UE 102 in accordance with embodiments of the present invention. It should be understood, however, that the mobile terminal 10 illustrated and hereinafter described is merely illustrative of one type of UE 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20*a*, an internal data modem (DM) 20*b*, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.16 techniques, and/or the like.

The mobile terminal 10 may comprise memory, such as a subscriber identity module (SIM) 38, a universal subscriber identity module (USIM), a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
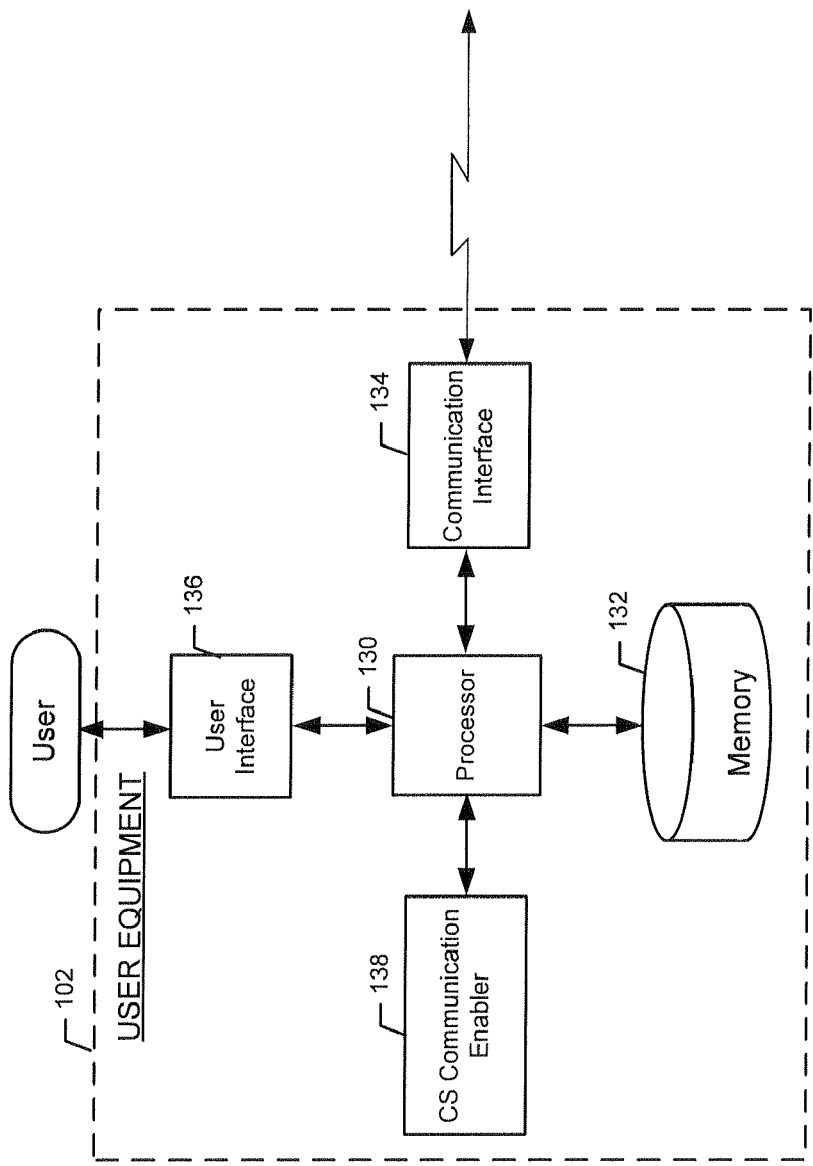
FIG. 3 illustrates a block diagram of a user equipment according to an exemplary embodiment of the present invention.

FIG. 3 illustrates a block diagram of a UE 102 according to an exemplary embodiment of the present invention. In an exemplary embodiment, the UE 102 includes various means, such as a processor 130, memory 132, communication interface 134, user interface 136, and CS communication enabler 138 for performing the various functions herein described. These means of the UE 102 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 132) that is executable by a suitably configured processing device (e.g., the processor 130), or some combination thereof.

The processor 130 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 130 comprises a plurality of processors. The plurality of processors may be in operative communication with each other and may be collectively configured to perform one or more functionalities of the UE 102 as described herein. In an exemplary embodiment, the processor 130 is configured to execute instructions stored in the memory 132 or otherwise accessible to the processor 130. These instructions, when executed by the processor 130, may cause the UE 102 to perform one or more of the functionalities of the UE 102 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may include, for example, volatile and/or non-volatile memory. Although illustrated in FIG. 3 as a single memory, the memory 132 may comprise a plurality of memories. The memory 132 may comprise volatile memory, non-volatile memory, or some combination thereof. In this regard, the memory 132 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the UE 102 to carry out various functions in accordance with exemplary embodiments of the present invention. For example, in at least some embodiments, the memory 132 is configured to buffer input data for processing by the processor 130. Additionally or alternatively, in at least some embodiments, the memory 132 is configured to store program instructions for execution by the processor 130. The memory 132 may store information in the form of static and/or dynamic information. This stored information may be stored and/or used by the CS communication enabler 138 during the course of performing its functionalities.

The communication interface 134 may be embodied as any device or means embodied in hardware, a computer program product comprising computer readable program instructions stored on a computer readable medium (e.g., the memory 132) and executed by a processing device (e.g., the processor 130), or a combination thereof that is configured to receive and/or transmit data from/to an entity of the system 100, such as an entity of the PS network 104 and/or CS network 106. In this regard, the communication interface 134 may be configured to access the PS network 104 and/or CS network 106 by establishing a radio connection with the eNB 110 and/or access point 120. In at least one embodiment, the communication interface 134 is at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with one or more entities of the system 100. The communication interface 134 may be configured to receive and/or transmit data using any protocol that may be used for communications between entities of the system 100. The communication interface 134 may additionally be in communication with the memory 132, user interface 136, and/or CS communication enabler 138, such as via a bus.

The user interface 136 may be in communication with the processor 130 to receive an indication of a user input and/or to provide an audible, visual, mechanical, or other output to a user. As such, the user interface 136 may include, for example, a keyboard, a mouse, a joystick, a display, a touch screen display, a microphone, a speaker, and/or other input/output mechanisms. The user interface 136 may provide an interface allowing a user to enter data, interact with data, send data, receive data, answer a voice call, and/or place a voice call. The user interface 136 may be in communication with the memory 132, communication interface 134, and/or CS communication enabler 138, such as via a bus.

The CS communication enabler 138 may be embodied as various means, such as hardware, a computer program product comprising computer readable program instructions stored on a computer readable medium (e.g., the memory 132) and executed by a processing device (e.g., the processor 130), or some combination thereof and, in one embodiment, is embodied as or otherwise controlled by the processor 130. In embodiments wherein the CS communication enabler 138 is embodied separately from the processor 130, the CS communication enabler 138 may be in communication with the processor 130. The CS communication enabler 138 may further be in communication with the memory 132, communication interface 134, and/or user interface 136, such as via a bus.

Figure 4:
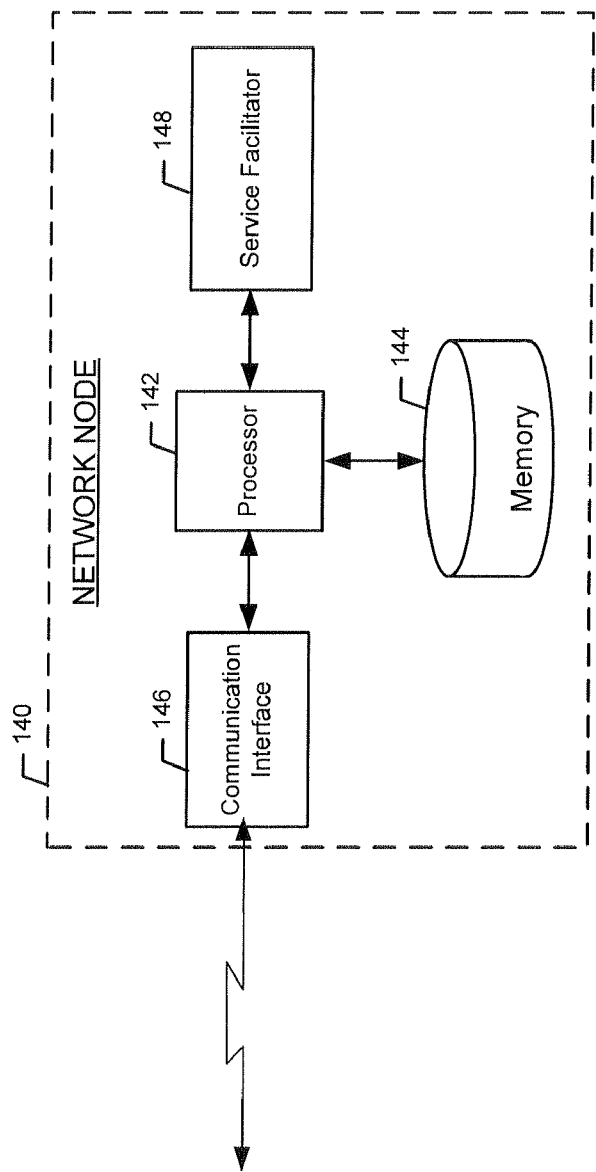
FIG. 4 illustrates a block diagram of a network node of a packet switched network according to an exemplary embodiment of the invention.

FIG. 4 illustrates a block diagram of a network node 140 of the PS network 104 according to an exemplary embodiment of the invention. In this regard, the network node 140 may comprise one or more entities of the PS network 104 and may, for example, comprise the eNB 110, EPC 112, MME 114, GW 116, some other network node(s) on the PS network 104, and/or some combination thereof. In an exemplary embodiment, the network node 140 includes various means, such as a processor 142, memory 144, communication interface 146, and service facilitator 148 for performing the various functions herein described. These means of the network node 140 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 144) that is executable by a suitably configured processing device (e.g., the processor 142), or some combination thereof.

The processor 142 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 142 comprises a plurality of processors. The plurality of processors may be embodied on a single computing device or distributed among a plurality of computing devices, which may be collectively configured to function as a network node 140. The plurality of processors may be in operative communication with each other and may be collectively configured to perform one or more functionalities of the network node 140 as described herein. In an exemplary embodiment, the processor 142 is configured to execute instructions stored in the memory 144 or otherwise accessible to the processor 142. These instructions, when executed by the processor 142, may cause the network node 140 to perform one or more of the functionalities of the network node 140 as described herein. As such, whether configured by hardware or software methods, or by a combination thereof, the processor 142 may comprise an entity capable of performing operations according to embodiments of the present invention while configured accordingly. Thus, for example, when the processor 142 is embodied as an ASIC, FPGA or the like, the processor 142 may comprise specifically configured hardware for conducting one or more operations described herein. Alternatively, as another example, when the processor 142 is embodied as an executor of instructions, such as may be stored in the memory 144, the instructions may specifically configure the processor 142 to perform one or more algorithms and operations described herein.

The memory 144 may include, for example, volatile and/or non-volatile memory. Although illustrated in FIG. 4 as a single memory, the memory 144 may comprise a plurality of memories. The memory 144 may comprise volatile memory, non-volatile memory, or some combination thereof. In this regard, the memory 144 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 144 may be configured to store information, data, applications, instructions, or the like for enabling the network node 140 to carry out various functions in accordance with exemplary embodiments of the present invention. For example, in at least some embodiments, the memory 144 is configured to buffer input data for processing by the processor 142. Additionally or alternatively, in at least some embodiments, the memory 144 is configured to store program instructions for execution by the processor 142. The memory 144 may store information in the form of static and/or dynamic information. This stored information may be stored and/or used by the service facilitator 148 during the course of performing its functionalities.

The communication interface 146 may be embodied as any device or means embodied in hardware, a computer program product comprising computer readable program instructions stored on a computer readable medium (e.g., the memory 144) and executed by a processing device (e.g., the processor 142), or a combination thereof that is configured to receive and/or transmit data from/to an entity of the system 100, such as to a UE 102 via a radio connection between the UE 102 and eNB 110. In at least one embodiment, the communication interface 146 is at least partially embodied as or otherwise controlled by the processor 142. In this regard, the communication interface 146 may be in communication with the processor 142, such as via a bus. The communication interface 146 may include, for example, an antenna, a transmitter, a receiver, a transceiver and/or supporting hardware or software for enabling communications with one or more entities of the system 100. The communication interface 146 may be configured to receive and/or transmit data using any protocol that may be used for communications between entities of the system 100. The communication interface 146 may additionally be in communication with the memory 144 and/or service facilitator 148, such as via a bus.

The service facilitator 148 may be embodied as various means, such as hardware, a computer program product comprising computer readable program instructions stored on a computer readable medium (e.g., the memory 144) and executed by a processing device (e.g., the processor 142), or some combination thereof and, in one embodiment, is embodied as or otherwise controlled by the processor 142. In embodiments wherein the service facilitator 148 is embodied separately from the processor 142, the service facilitator 148 may be in communication with the processor 142. The service facilitator 148 may further be in communication with the memory 144 and/or communication interface 146, such as via a bus.

The UE 102 may be connected to the PS network 104 and may be engaged in an active PS communication over the PS network 104. In this regard, the UE 102 may be connected to the PS network 104 in an active connection mode, such as, for example, evolved packet system (EPS) services mobility management connected mode (EMM-CONNECTED mode), EPS connection management connected mode (ECM-CONNECTED), and/or the like. The UE 102 may also be within radio range of the access point 120 and thus capable of connecting to the CS network 106. The UE 102 may comprise an end point for an incoming or outgoing communication requiring a CS connection. In this regard, the UE 102 may comprise an originating end point for the communication or a remote device may have originated the communication and the UE 102 may comprise the terminating end point for the communication. The communication may, for example, comprise a voice call. The PS network 104 may not be configured to provide for CS connections and may further not support CSFB. Accordingly, since the communication may require a CS connection and the PS network 104 may not directly support CS connections or support CSFB, embodiments of the invention provide a solution for handling a legacy CS communication.

In this regard, some embodiments of the invention provide for a UE 102-based solution for handling a legacy circuit switched communication. The CS communication enabler 138 may be configured to determine that a communication for which the UE 102 is an end point requires a CS connection. In response to the determination, the CS communication enabler 138 may be configured to initiate a release of the UE 102 from the PS network 104.

The CS communication enabler 138 may be configured to initiate a release of the UE 102 by sending a request for connection release to the network node 140. The service facilitator 148 may receive the request for connection release and in response to the request release the connection between the UE 102 and the PS network 140. The service facilitator 148 may be configured to release the connection by sending a connection release message to the UE 102. The service facilitator 148 may include redirection information proposing a circuit switched capable cell for the UE 102 to reselect to in the connection release message. In one embodiment, the service facilitator 148 may send the connection release message from the MME 114 to the eNB 110, which may then forward the connection release message to the UE 102. The CS communication enabler 138 may be configured to receive a connection release message. Once the connection is released (e.g., upon receipt of a connection release message), the CS communication enabler 138 may be configured to send a CS connection establishment request to a network node on a CS capable cell. In this regard, the CS communication enabler 138 may establish a radio connection with the access point 120 of the CS network 106 and send a CS connection establishment request to a network node of the CS network, such as, for example, to the CSCN 122. When a received connection release message includes redirection information, the CS communication enabler 138 may be configured to send a CS connection establishment request to a network node on a CS capable cell selected based at least in part upon a proposed cell included in the connection release message. Once the CS connection is established over the CS network 106, the UE 102 may engage in the communication requiring a CS connection.

Additionally or alternatively, the CS communication enabler 138 may be configured to initiate a release of the UE 102 by autonomously re-selecting to a CS capable cell, such as by reselecting to the access point 120 and establishing a CS connection with the CS network 106.

Some embodiments of the invention in addition to or alternative to UE 102-based solutions provide network node 140-based solutions for handling a legacy circuit switched communication. In embodiments providing a network node-based solution, the service facilitator 148 may be configured to receive a service request message. The service request message may have originated from an end point of a communication for which the UE 102 is an end point. In this regard, the CS communication enabler 138 or other element of the UE 102 may be configured to send a service request message to the network node 140. Upon receipt of the service request message, the service facilitator 148 may be configured to determine that the service request message comprises a request for establishment of a communication requiring a CS connection and having the UE 102 as an end point. As the PS network 104 may not support CS connections or CSFB, the service facilitator 148 may then release the connection between the UE 102 and PS network 104 based at least in part upon the determination. In releasing the connection, the service facilitator 148 may be configured to send the UE 102 a connection release message. The connection release message may comprise redirection information proposing a circuit switched capable cell for the UE 102 to reselect to. In this regard, the service facilitator 148 may be configured to access a list or mapping of neighboring cells, such as may be stored in the memory 144, that may include an indication of capabilities of those cells and select a circuit switched capable cell to propose to the UE 102. The connection release message may indicate the PS network 104 is not CS capable and may instruct the UE 102 to reselect to a network cell that is CS capable (e.g., to the CS network 106). The CS communication enabler 138 may be configured to receive the connection release message and in response may reselect or otherwise establish a CS connection with a CS capable cell, such as by establishing a connection with the CS network 106 through the access point 120. When the connection release message includes redirection information, the CS communication enabler 138 may reselect to a CS capable cell selected based at least in part upon a proposed cell included in the connection release message.

Figure 5:
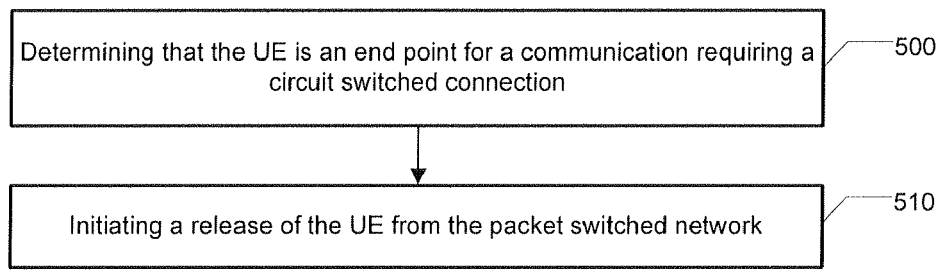
FIGS. 5-6 illustrate flowcharts according to exemplary methods for handling a legacy circuit switched communication according to exemplary embodiments of the invention.

FIG. 5 illustrates a flowchart according to an exemplary method for handling a legacy circuit switched communication according to an exemplary embodiment of the invention. In this regard, FIG. 5 illustrates operations that may occur at the UE 102. The method may include the CS communication enabler 138 determining that the UE 102 is an end point for a communication requiring a CS connection, at operation 500. Operation 510 may comprise the CS communication enabler 138 initiating a release of the UE 102 from the PS network 104 in response to the determination.

Figure 6:
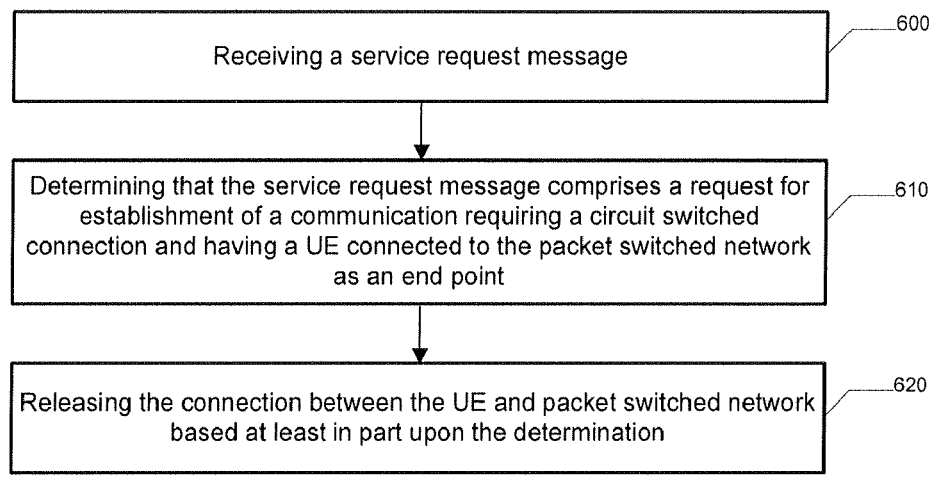

FIG. 6 illustrates a flowchart according to an exemplary method for handling a legacy circuit switched communication according to an exemplary embodiment of the invention. In this regard, FIG. 6 illustrates operations that may occur at the network node 140. The method may include the service facilitator 148 receiving a service request message, at operation 600. Operation 610 may comprise the service facilitator 148 determining that the service request message comprises a request for establishment of a communication requiring a CS connection and having a UE 102 connected to the PS network 104 as an end point of the communication. The service facilitator 148 may then release the connection between the UE 102 and PS network 104 based at least in part upon the determination.

FIGS. 5-6 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and network operators. Embodiments of the invention facilitate the release of a user equipment that is connected to a packet switched network that does not support circuit switched fallback when the user equipment is an endpoint for a communication requiring a circuit switched connection. In this regard, embodiments of the invention enable the released user equipment to reselect to a network or network cell that supports circuit switched connection so that the user equipment may engage in the circuit-switched communication. Circuit-switched communications may comprise voice calls which may have higher priority than typical packet-switched communications such as, for example, web browsing.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method, comprising:
   determining, by a user equipment engaged in an active packet switched communication and connected to a packet switched network that does not support circuit switched fallback, that the user equipment is an end point for a communication requiring a circuit switched connection; and
   initiating, by the user equipment and while engaged in the active packet switched communication, a release of the user equipment from the packet switched network by autonomously re-selecting the user equipment to a circuit switched capable cell.

2. A method according to claim 1, wherein the initiating comprises sending a request for connection release to a network node on the packet switched network.

3. A method according to claim 2, wherein the network node on the packet switched network comprises a mobility management entity.

4. A method according to claim 2, further comprising: receiving a connection release.

5. A method according to claim 4, wherein the connection release comprises redirection information proposing a circuit switched capable cell.

6. A method according to claim 1, wherein the user equipment is engaged in a evolved packet system connected mode.

7. A method according to claim 1, wherein the user equipment is an originating end point for a communication requiring a circuit switched connection.

8. A method according to claim 1, wherein the user equipment is a terminating end point for a communication requiring a circuit switched connection.

9. An apparatus comprising:
   at least one processor; and
   at least one memory including computer program code, the at least one processor the at least one memory, and the computer program code configured to cause the apparatus to at least:
      determine, while engaged in an active packet switched communication with a packet switched network, that the apparatus is an end point for a communication requiring a circuit switched connection, wherein the packet switched network does not support circuit switched fallback; and
      initiate, while engaged in the active packet switched communication, a release of the apparatus from the packet switched network by autonomously re-selecting the apparatus to a circuit switched capable cell.

10. An apparatus according to claim 9, wherein the initiating sends a request for connection release to a network node on the packet switched network.

11. An apparatus according to claim 10, wherein the network node on the packet switched network comprises a mobility management entity.

12. An apparatus according to claim 10, further configured to at least receive a connection release message.

13. An apparatus according to claim 12, wherein the connection release message comprises redirection information proposing a circuit switched capable cell.

14. An apparatus according to claim 9, wherein the apparatus is engaged in a evolved packet system connected mode.

15. An apparatus according to claim 9, wherein the apparatus is an originating end point for a communication requiring a circuit switched connection.

16. An apparatus according to claim 9, wherein the apparatus is a terminating end point for a communication requiring a circuit switched connection.

17. A computer program product comprising a non-transitory computer-readable medium encoded with instructions that, when executed by at least one processor perform at least the following:
   determining, at a user equipment engaged in an active packet switched communication with a packet switched network, that the user equipment is an end point for a communication requiring a circuit switched connection, wherein the packet switched network does not support circuit switched fallback; and
   initiating, by the user equipment and while engaged in the active packet switched communication, a release of the user equipment from the packet switched network by autonomously the user equipment to a circuit switched capable cell.

18. The method of claim 1, wherein the active packet switched communication between the user equipment and the packet switched network comprises an evolved packet system connected mode.

19. The apparatus of claim 9, wherein the active packet switched communication between the user equipment and the packet switched network comprises an evolved packet system connected mode.

* * * * *